United States Statutory Invention Registration [19]

[11] Reg. Number: H232

Selzer [43] Published: Mar. 3, 1987

[54] SMOKE-PRODUCING COMPOSITION

[75] Inventor: Joel H. Selzer, Baltimore, Md.

[73] Assignee: The United States of America as represented by the Secretary of the Army, Washington, D.C.

[21] Appl. No.: 900,918

[22] Filed: Aug. 26, 1986

[51] Int. Cl.[4] ..... C06B 39/06; C06B 33/02; C06B 33/04

[52] U.S. Cl. ..... 149/30; 149/43; 149/44; 149/117

*Primary Examiner*—John F. Terapane
*Assistant Examiner*—Eric Jorgensen
*Attorney, Agent, or Firm*—Anthony T. Lane; Harold H. Card, Jr.; Edward F. Costigan

[57] ABSTRACT

The composition of this invention contains red phosphorus, magnesium, sodium nitrate, and an epoxy binder. It can optionally contain silica to aid in processing. The magnesium is used to sustain the smoke produced by the red phosphorus for a period greater than 5 minutes for screening of military operations. Further, the composition does not exhibit any increased sensitivity to impact or friction over traditional smoke-producing compositions. This is the case even though the composition contains a high-level of red phosphorus.

8 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SMOKE-PRODUCING COMPOSITION

GOVERNMENTAL INTEREST

This invention described herein may be manufactured, used and licensed by or for the Government for Governmental purposes without payment to me of any royalties thereon.

This invention relates to an improved smoke-producing composition for use in sustained military screening without increased sensitivity to external stimuli such as friction or impact.

BACKGROUND OF THE INVENTION

Red phosphorus is used as a smoke-producing agent in a number of ammunition items. The red phosphorus burns in the presence of oxygen to form anhydrous phosphoric acid which, when combined with moisture in the air, forms a thick white cloud of smoke. A certain amount of heat input is required to start the reaction, and this is provided by a match or ignition mixture. After the reaction is initiated, exothermic heat aids in sustaining the smoke-producing process.

If loose red phosphorus powder is ignited, it will react vigorously because adequate air is available to each particle in the powdered mass. However, when the red phosphorus is pressed into a pellet, the air voids are eliminated. In the latter situation, the oxygen is only available to the outer surface of the pellet. As a result, reaction can only occur at the surface of the pellet. Although the reaction is controllable by the latter pelletized arrangement, sufficient heat is not produced to sustain significant smoke-production. In such a situation, the smoke is often thin, and of little use in the screening of a military operation.

To produce an adequate smoke-screen, the art intimately mixes an oxygen source into the red phosphorus powder prior to pressing the same into a pellet. This solution of the cited problem was found adequate for the intended purpose of the art. The oxygen sources are called oxidizers, and include such ingredients as nitrates, chlorates, oxides and chromates. The nitrates such as sodium nitrate are preferred for use with red phosphorus to produce a military screen. Sodium nitrate is a good source of oxygen, inexpensive, substantially free of contaminants, and does not render the red phosphorus overly reactive. When the composition is overly reactive, it could be explosive.

However, there is a serious drawback with the use of oxidizers in the formulation. As you increase the concentration of oxidizer in a specific formulation, the following are increased, viz: the reaction rate, the heat output, and the sensitivity to various stimuli such as friction and impact. A concentration of oxidizer in the formulation could be reached where there would be sufficient oxygen available to react with all the red phosphorus in the formulation without the need for additional air. However, at that point, there would be excessive heat output, and the sensitivity would be increased to a dangerous level.

In the art, the concentration of oxidizer in the formulation is below the above described concentration so that a controllable reaction will occur with only sufficient heat to propogate the reaction. To be more specific, the formulation utilized in the art for the M819 contains 79.5 percent red phosphorus and 14 percent sodium nitrate. These pellets produce a very large volume of smoke in a 2.5 minute time frame. While performance of this formulation is considered quite good, it falls short of the desired 5 minute screening requirement. As described, this formulation produces a very large volume of smoke. In fact, more smoke is produced by this formulation than is necessary for adequate screening purposes. If this volume of smoke could be redistributed over a 5 minute time frame, the requirement for a sustained screen for military operations would be adequately met.

SUMMARY OF THE INVENTION

It is an object of this invention to provide a smoke-producing composition which will produce a sustained cloud of smoke in excess of 5 minutes for screening of military operations, such composition without enhanced sensitivity to external stimuli such as friction and impact.

This invention consists of a composition containing red phosphorus, sodium nitrate, magnesium, and a binder. This composition produces a controlled output of smoke providing adequate screening of a military operation in excess of 5 minutes. In the composition, the red phosphorus is converted to smoke. The nitrate concentration controls the amount of oxygen available to the red phosphorus thereby controlling the rate of reaction and the smoke output. Further, the magnesium provides supplementary heat required by the composition to assure a sustained reaction rate.

By reducing the sodium nitrate, i.e. the oxidizer, the production of smoke is reduced because of a slower burn rate. Also, when the reaction is slowed, the heat output of the reaction is reduced to a level which is inadequate for sustaining the smoke-producing process at the desired rate. However, magnesium is a fuel similar to red phosphorus because it burns in the presence of air. Magnesium gives off a great deal of heat, and when added to the composition in granulated form, gives off intermittent surges of heat. Also, fortunately, magnesium does not increase sensitivity to the cited stimuli.

In the broad sense, the composition of this invention contains the following ingredients in the proportions given, viz:

| Ingredients | Parts by Weight |
|---|---|
| 1. Red phosphorus | 72 to 80 |
| 2. Sodium nitrate | 7 to 10 |
| 3. Magnesium | 7 to 10 |
| 4. Binder | 6.0 |

The composition may also contain 1.25 parts by weight of silica for ease of processing.

Note should be taken, however, that the combined percentage of nitrate and magnesium should be at about 17.0 parts by weight in order to sustain an adequate reaction rate without increased sensitivity to external stimuli such as friction and impact.

Further, the oxidizing agent, sodium nitrate, should be present in the composition between 7 and 10 parts by weight. If an amount greater than about 10 parts by weight is used, the composition becomes increasingly sensitive to impact and friction. Also, the composition will burn too fast to sustain 5 minutes of smoke screening. If the sodium nitrate is present in less than 7 parts by weight, the composition is slow to ignite and the production rate of smoke is not sufficient to achieve an adequate screen.

Also, the magnesium should be present in the composition between 7 and 10 parts by weight. If an amount less than 7 parts is used, the burn reaction does not have sufficient heat to sustain good smoke production. If the amount of magnesium is above 10 parts, the improvement to the rate of smoke production is negligible, and the additional magnesium would therefore be wasteful.

The epoxy binder of the composition is preferably present at about 6 parts by weight. It can be present in an amount between 6 and 8 parts by weight. Below 6 parts, the physical strength and integrity of the pellet could not be maintained during firing of the munition. Eight parts epoxy provides more than adequate strength for all current and planned uses for this composition.

Based on a total of 100 parts of composition (excluding silica) and the allowable variations in other ingredients, the resulting limits in the amount of red phosphorus (72 to 80 parts by weight) will provide for an acceptable amount of red phosphorus to provide good smoke.

PREFERRED EMBODIMENT

To be more specific, the composition JXS-10, contains the following ingredients in the optimum proportions indicated, viz.

| Ingredient | Parts by Weight |
|---|---|
| Red Phosphorus, Technical, MIL-P-211C, 12 Feb 80, Class 2, extra fine | 77.0 |
| Sodium Nitrate, MIL-S-322B, 5 Feb 68, Grade B, Class 2 | 9.0 |
| Magnesium, MIL-M-382C, 10 Aug 78, Type 1, Grade A, granulation 6 | 8.0 |
| EPON 828 Resin, Shell Chemical | 3.0 |
| Versamid V140 Hardener, General mills | 3.0 |
| Silica, MIL-S-14760, 10 May 1968 | 1.25 (optional) |

The composition JXS-10 was prepared in the following manner, viz.

(a) Pre-mix the resin and hardener, then dilute with acetone to reduce the viscosity of the mix.

(b) Blend the RP, sodium nitrate, epoxy solution, and magnesium with acetone to render the mix to a dough-like consistency. Continue mixing until acetone content is 1% by weight.

(c) The silica is added at this point as a flow enhancer.

(d) Granulate the mix through an eight-mesh screen.

(d) Press the material into a pellet under a load of 12000–18000 psi.

(f) Cure the pellet at 140° F. for 48 hours.

In the development of the composition of the present invention, the object was to take the smoke previously produced for 3 minutes by the conventional composition of the military art, and to distribute such smoke produced over a longer period of time. However, when the amount of nitrate in the conventional compositions was reduced, the rate of smoke production was decelerated and the conventional composition had difficulty in sustaining itself. But, sensitivity to external stimuli was reduced. To distribute the smoke produced by the conventional compositions over a longer period, magnesium was added to the composition. The magnesium, when evenly distributed in the composition provided a supplementary heat source. Fortunately, such addition of magnesium did not contribute to the sensitivity of the composition containing the reduced amount of sodium nitrate. The magnesium was found to provide intermittent surges of heat for 6 to 7 minutes. These heat surges supplemented the normal heat of reaction of the composition, and helped to sustain good smoke production without accelerating the reaction between the red phosphorus and the sodium nitrate.

In previous smoke-producing compositions of the military art, it was found that when the amount of sodium nitrate contained therein was about 14 percent, a very large quantity of smoke was produced at a highly accelerated rate. However, in such a situation, the adequate production of smoke from such compositions was complete in about 3 minutes. It was also found that ignitability and sensitivity of such compositions to external stimuli such as friction and impact was extremely high thus tending towards a dangerous situation.

The smoke-producing composition of this invention is called the U.S. Army Composition JXS–10. This composition provides an excellent screen of smoke for military operations in excess of 5 minutes which is quite adequate for its intended purpose. Further, the pellet embodying this composition is less sensitive to external stimuli such as friction and impact when compared to the conventional smoke-producing compositions of this military art.

In conclusion, it has been found that a composition consisting essentially of red phosphorus, sodium nitrate, magnesium and an epoxy binder within critical proportions satisfy the needs of the art for effective field applications relative military screening operations.

What is claimed is:

1. An improved smoke composition for use in screening military operations for a sustained period coupled with reduced sensitivity leading to deflagration from friction or impact consisting essentially of:

(a) red phosphorus being present in an amount between about 72 to 80 parts by weight, (b) sodium nitrate being present in an amount between about 7 and about 10 parts by weight, (c) magnesium being present in an amount between about 7 and about 10 parts by weight, and a (d) a binder being present in an amount of about 6 parts by weight, the additive percentage of said nitrate and magnesium being about 17 parts by weight.

2. The composition of claim 1 including about 1.25 parts by weight of silica.

3. A smoke composition for use in screening military operations for a period of greater than about 5 minutes coupled with reduced sensitivity to friction or impact consisting essentially of:

(a) Red phosphorus present in an amount of about 77 parts by weight, (b) Sodium nitrate present in an amount of 9 parts by weight, (c) Magnesium present in an amount of about 8 parts by weight, and (d) a binder present in an amount of about 6 parts by weight.

4. The composition of claim 3 including about 1.25 parts by weight of silica.

5. An improved smoke producing pellet for use in screening military operations coupled with reduced deflagration sensitivity from impact and friction consisting essentially of (a) Red phosphorus present in an amount between about 72 to 80 parts by weight, (b) Sodium nitrate present in an amount between about 7 and about 10 parts by weight, (c) Magnesium present in an amount between about 7 and about 10 parts by weight, and (d) A binder present in an amount of about 6 parts by weight, the additive percentage of said nitrate and magnesium being about 17 parts by weight.

6. The composition of claim 5 including about 1.25 parts by weight of silica.

7. An improved smoke producing pellet for use in screening military operations coupled with reduced explosive sensitivity to impact and friction, consistimg essentially of (a) Red phosphorus present in an amount of about 77 parts by weight, (b) Sodium nitrate present in an amount of 9 parts by weight, (c) Magnesium present in an amount of about 8 parts by weight, and (d) A binder present in an amount of about 6 parts by weight.

8. The composition of claim 7 including about 1.25 parts by weight of silica.

* * * * *